(12) United States Patent
Kenko et al.

(10) Patent No.: US 11,315,744 B2
(45) Date of Patent: Apr. 26, 2022

(54) ELECTRIC STORAGE DEVICE

(71) Applicant: Murata Manufacturing Co., Ltd., Nagaokakyo (JP)

(72) Inventors: Takuya Kenko, Nagaokakyo (JP); Toru Kawai, Nagaokakyo (JP); Masahiro Otsuka, Nagaokakyo (JP); Masashi Higuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 15 days.

(21) Appl. No.: 16/186,885

(22) Filed: Nov. 12, 2018

(65) Prior Publication Data

US 2019/0080855 A1 Mar. 14, 2019

Related U.S. Application Data

(63) Continuation of application No. PCT/JP2017/018821, filed on May 19, 2017.

(30) Foreign Application Priority Data

May 20, 2016 (JP) .............................. JP2016-101183

(51) Int. Cl.
*H01G 11/78* (2013.01)
*H01G 11/76* (2013.01)
(Continued)

(52) U.S. Cl.
CPC ............. *H01G 11/78* (2013.01); *H01G 11/26* (2013.01); *H01G 11/52* (2013.01); *H01G 11/58* (2013.01);
(Continued)

(58) Field of Classification Search
CPC .. H01G 4/35; H01G 2/02; H01G 2/06; H01G 4/224; H01G 9/08; H01G 9/10;
(Continued)

(56) References Cited

U.S. PATENT DOCUMENTS

| 5,366,515 A * | 11/1994 | Kunugihara | H01G 9/00 29/25.03 |
| 8,094,434 B2 * | 1/2012 | Rawal | H01G 2/12 361/538 |

(Continued)

FOREIGN PATENT DOCUMENTS

| CN | 203071178 U | 7/2013 |
| CN | 203760523 U | 8/2014 |

(Continued)

OTHER PUBLICATIONS

International Search Report issued for PCT/JP2017/018821, dated Jun. 27, 2017.

(Continued)

*Primary Examiner* — Michael P McFadden
(74) *Attorney, Agent, or Firm* — ArentFox Schiff LLP

(57) ABSTRACT

An electric storage device includes a case having a substantially rectangular shape including a cutout part. An electrode body is disposed in the case and includes a first electrode, a second electrode, and a separator disposed between the first and second electrodes. An electrolyte is located in the case and at least partially impregnating the electrode body. A first electrode terminal is located on a first part of a side surface of the case and is electrically connected to the first electrode by a first connection member which has elasticity in a direction extending from the first electrode terminal to the first electrode. A second electrode terminal is located on a second part of the side surface of the case and is electrically connected to the second electrode by a second elastic connection member which has elasticity in a direction extending from the second electrode terminal to the second electrode.

25 Claims, 10 Drawing Sheets

(51) Int. Cl.
*H01G 11/72* (2013.01)
*H01M 10/04* (2006.01)
*H01M 50/10* (2021.01)
*H01M 50/103* (2021.01)
*H01M 50/116* (2021.01)
*H01M 50/172* (2021.01)
*H01M 50/531* (2021.01)
*H01M 50/543* (2021.01)
*H01G 11/26* (2013.01)
*H01G 11/52* (2013.01)
*H01G 11/58* (2013.01)
*H01M 10/058* (2010.01)
*H01G 11/66* (2013.01)
*H01G 11/74* (2013.01)

(52) U.S. Cl.
CPC ............. *H01G 11/72* (2013.01); *H01G 11/76* (2013.01); *H01M 10/04* (2013.01); *H01M 10/0436* (2013.01); *H01M 50/10* (2021.01); *H01M 50/103* (2021.01); *H01M 50/116* (2021.01); *H01M 50/172* (2021.01); *H01M 50/531* (2021.01); *H01M 50/543* (2021.01); *H01G 11/66* (2013.01); *H01G 11/74* (2013.01); *H01M 10/058* (2013.01); *H01M 2220/30* (2013.01)

(58) Field of Classification Search
CPC ........ H01G 11/78; H01G 11/80; H01G 11/84; H01G 9/008; H01G 9/02; H01G 9/045; H01G 9/145; H01G 2009/0408; H01G 11/26; H01G 11/52; H01G 11/58; H01G 11/72; H01G 11/76; H01G 11/66; H01G 11/74; Y02E 60/13; H01M 2/0202; H01M 2/0217; H01M 2/0285; H01M 2/06; H01M 2/26; H01M 2/30; H01M 10/0436; H01M 10/058; H01M 2002/0205; H01M 2220/30

See application file for complete search history.

(56) References Cited

U.S. PATENT DOCUMENTS

| | | | | |
|---|---|---|---|---|
| 2005/0175889 | A1* | 8/2005 | Han | H01M 50/572 429/61 |
| 2010/0104941 | A1* | 4/2010 | Nakabayashi | H01M 50/172 429/181 |
| 2010/0239897 | A1* | 9/2010 | Sumihara | H01M 50/528 429/94 |
| 2012/0189899 | A1* | 7/2012 | Kanda | H01M 50/543 429/153 |
| 2015/0062783 | A1* | 3/2015 | Lark | H01G 2/103 361/518 |
| 2015/0086842 | A1 | 3/2015 | Kang et al. | |
| 2017/0275506 | A1 | 9/2017 | Sasaki | |

FOREIGN PATENT DOCUMENTS

| | | |
|---|---|---|
| JP | 2001093576 A | 4/2001 |
| JP | 2001135358 A | 5/2001 |
| JP | 2004006226 A | 1/2004 |
| JP | 2011165475 A | 8/2011 |
| JP | 2014229435 A | 12/2014 |
| JP | 2015519691 A | 7/2015 |
| WO | 2016051674 A1 | 4/2016 |

OTHER PUBLICATIONS

Written Opinion of the International Searching Authority issued for PCT/JP2017/018821, dated Jun. 27, 2017.

* cited by examiner

ELECTRIC STORAGE DEVICE

CROSS REFERENCE TO RELATED APPLICATIONS

The present application is a continuation of International application No. PCT/JP2017/018821, filed May 19, 2017, which claims priority to Japanese Patent Application No. 2016-101183, filed May 20, 2016, the entire contents of each of which are incorporated herein by reference.

TECHNICAL FIELD

The present invention relates to an electric storage device.

BACKGROUND OF THE INVENTION

Conventionally, electric storage devices have been used as power sources for various kinds of electronic devices. For example, Japanese Patent Application Laid-open No. 2004-6226 (Patent Document 1) discloses a battery including an electrode body obtained by laminating and winding a positive electrode, a separator, and a negative electrode.

In some cases, when the size of an electronic device needs to be reduced, only an installation space which does not have a rectangular shape in plan view can be used as an installation space for an electrical storage device in the electronic device. For this reason, an electrical storage device not having a rectangular shape in plan view is desired.

Impact resistance is also required for the electric storage device.

It is a main object of the present invention to provide an electrical storage device which does not have a rectangular shape in plan view but which does have excellent impact resistance.

BRIEF DESCRIPTION OF THE INVENTION

In accordance with one aspect of the invention, an electric storage device includes a case having a substantially rectangular shape including a cutout part. An electrode body is disposed in the case and includes a first electrode, a second electrode, and a separator disposed between the first and second electrodes. An electrolyte is located in the case and at least partially impregnates the electrode body. A first electrode terminal is located on a first part of a side surface of the case and is electrically connected to the first electrode by a first connection member which has elasticity in a direction extending from the first electrode terminal to the first electrode. A second electrode terminal is located on a second part of the side surface of the case and is electrically connected to the second electrode by a second elastic connection member which has elasticity in a direction extending from the second electrode terminal to the second electrode.

In a preferred aspect of the invention, the positive and negative electrode terminals are each provided on respective parts of the side surface of the case which do not form part of the cutout part.

In accordance with a further aspect of the invention, a virtual straight line connecting a center of the first electrode terminal and a center of the second electrode terminal does not overlap with the electrode body in plan view.

In a preferred embodiment, the first electrode includes a first electrode body and a first extended part extending from the first electrode body and the second electrode includes a second electrode body facing and a second extended part extending from the second electrode body. The first and second electrode bodies face one another. The first connection member is constituted by a plate member including a first part connected to the first extended part, a second part connected to the first connection member, and a first bent part connecting the first and second parts. The second connection member is constituted by a plate member including a third part connected with the second extended part, a fourth part connected with the second connection member, and a second bent part connecting the third and fourth parts.

In an aspect of the invention, the first electrode, the second electrode, and the separator are integrated in the electrode body and the electrode body and the case are physically joined together.

In an aspect of the invention, the electrode body and the case are physically joined together by an adhesive layer bonding the electrode body and the case.

In at least one embodiment, the first and second electrode terminals are formed by the case.

The present invention can provide an electric storage device not having a rectangular shape in plan view but having excellent impact resistance.

MODE FOR CARRYING OUT THE INVENTION

Figure 1:
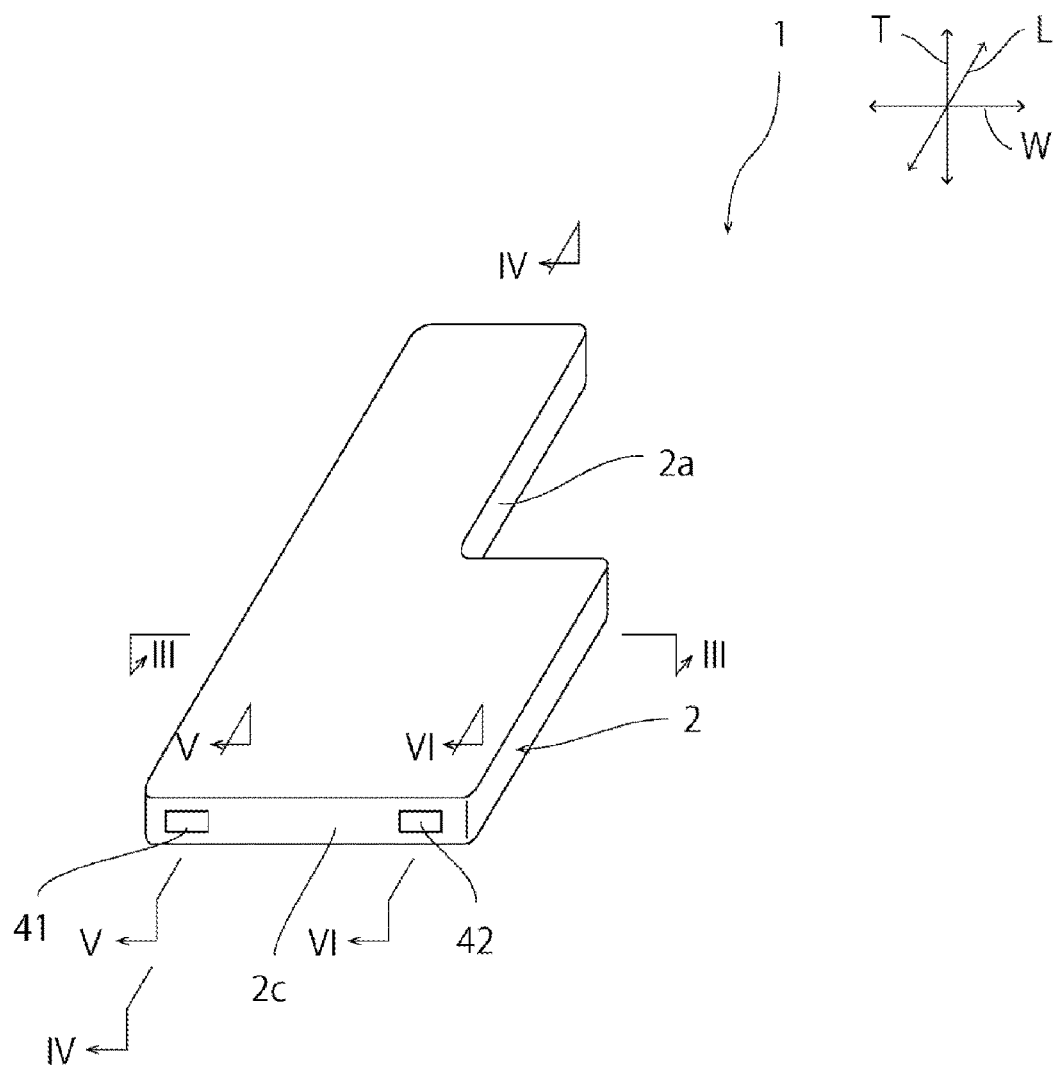
FIG. 1 is a schematic perspective view of an electric storage device according to a first embodiment.

Exemplary preferred embodiments of the invention will be described below. The following embodiments are merely exemplary and the invention is not limited to the following embodiments.

In drawings referred to in the embodiments and the like, components having effectively identical functions will be denoted by an identical reference number. The drawings referred to in the embodiments and the like are schematically illustrated. For example, the dimensional ratios of objects illustrated in the drawings are different from the dimensional ratio of objects in reality in some cases. For example, the dimensional ratios of objects are also different between the drawings in some cases. For example, specific dimensional ratios of objects should be determined based on the following description.

First Embodiment

An electric storage device 1 illustrated in FIGS. 1 to 4 includes an electrolyte 4 (see FIG. 3) such as electrolytic solution. Specifically, the electric storage device 1 may be, for example, a battery such as a secondary battery, or a capacitor such as an electric double-layer capacitor.

Figure 2:
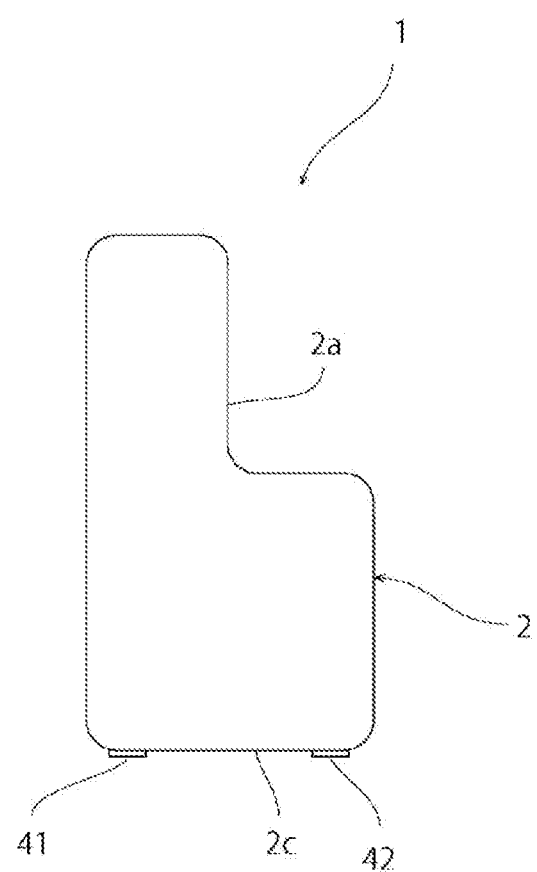
FIG. 2 is a schematic plan view of the electric storage device according to the first embodiment.
Figure 3:
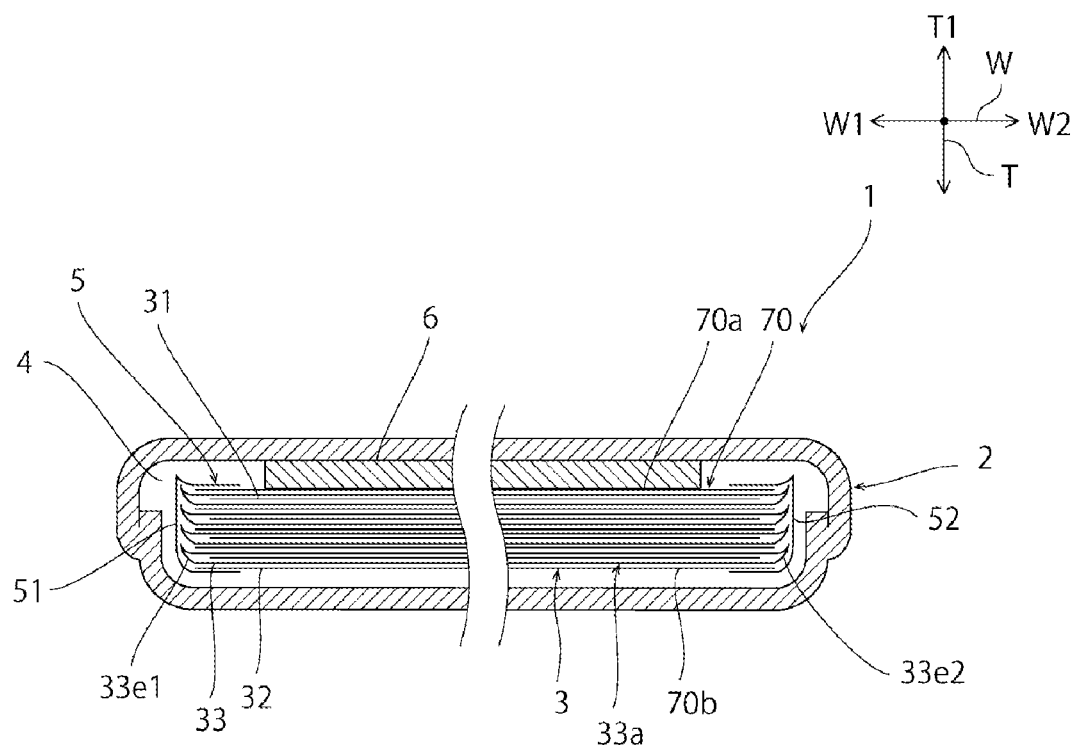
FIG. 3 is a schematic cross-sectional view taken along line III-III in FIG. 1.

As illustrated in FIGS. 1 to 3, the electric storage device 1 includes a case 2 having a generally rectangular shape including a cutout part 2a in plan view (i.e., as viewed in FIG. 2). As used herein, the phrase a "rectangular shape including a cutout part" includes a rectangular shape including a cutout part and rounded corners.

In the electric storage device 1, the cutout part 2a also has a substantially rectangular shape in plan view (again, as viewed in FIG. 3). Specifically, a single cutout part 2a having a substantially rectangular shape with rounded inner and outer corners is provided. However, the present invention is not limited to this configuration. For example, the case may be provided with a plurality of cutout parts. For example, a cutout part may be provided at each of a plurality of corners of the case. The shape of the cutout part provided to the case is not limited, too. The cutout part provided to the case may have, for example, an arcuate shape, a polygonal shape, or a shape that is a combination thereof.

The case 2 may be made of a conductor or an insulator. The case 2 may, for example, be made of metal such as aluminum, stainless steel, or copper, or an insulator such as resin.

As illustrated in FIG. 3, an electrode body 3 is disposed inside the case 2. The electrode body 3 includes a plurality of positive electrodes 31, a plurality of negative electrodes 32, and a plurality of separators 33. Each positive electrode 31 faces an adjacent negative electrode 32 with a respective separator 33 located there between to form a positive/negative electrode pair. The separator 33 insulates the positive and negative electrodes 31 and 32. In the present embodiment, each positive electrode 31 is surrounded by a pair of separators 33 (one located above the positive electrode 31 and one located below the positive electrode 31) and lateral side edges of those separators are connected with each other to form a separator bag 33a with the positive electrode 31 disposed therein. However, in the present invention, separators which are adjacent to each other in the lamination direction T do not have to be joined into a bag shape.

The present embodiment describes an example in which the electrode body 3 is a laminated electrode body obtained by laminating the plurality of sheet shaped positive electrodes 31, the plurality of sheet shaped separators 33, and the plurality of sheet shaped negative electrode 32. However, the present invention is not so limited. The electrode body is not particularly limited as long as the electrode body has a configuration that allows the accumulation of electrical power. For example, the electrode body may be achieved by a wound body obtained by winding a lamination sheet in which a plurality of positive/negative electrode pairs are provided, each positive/negative electrode pair including a respective positive electrode, a respective separator, and a respective negative electrode, all of which are laminated in the stated order.

The configuration of the positive electrode 31 may be determined as appropriate in accordance with the type of the electric storage device 1 it is used in. For example, when the electric storage device 1 is a secondary battery, the positive electrode 31 may include a positive electrode collector, and an active material layer provided on at least one surface of the positive electrode collector. For example, when the electric storage device 1 is an electric double-layer capacitor, the positive electrode 31 may include a positive electrode collector, and a polarizable electrode layer provided on at least one surface of the positive electrode collector.

The configuration of the negative electrode 32 may similarly be determined as appropriate in accordance with the type of the electric storage device 1 it is used in. For example, when the electric storage device 1 is a secondary battery, the negative electrode 32 may include a negative electrode collector, and an active material layer provided on at least one surface of the negative electrode collector. By way of further example, when the electric storage device 1 is an electric double-layer capacitor, the negative electrode 32 may include a negative electrode collector and a polarizable electrode layer provided on at least one surface of the negative electrode collector.

Some or all of the separators 33 may be, for example, a porous sheet including open cells through which ions in an electrolyte are movable. The separators 33 may be made of, for example, polypropylene, polyethylene, polyimide, cellulose, aramid, polyvinylidene fluoride, or Teflon (registered trademark). The surface of the separators 33 may be covered by an inorganic particle coat layer, a bonding layer, or the like. The surface of the separators 33 may have a bonding property. The separators 33 may be a single-layer film made of one kind of material, or may be a composite film or multi-layered film made of one or two or more types of material.

In place of the separators 33, or in addition to the separators 33, an insulation layer such as an inorganic particle coat layer may be provided on the surface of each of the positive electrode 31 and the negative electrode 32. In such a case, the insulator acts as the separator (and can be considered a separator for the purpose of the present invention.

In each of the positive and negative electrodes 31 and 32, an undercoat layer containing, for example, carbon may be provided between the collector and the active material layer.

As noted above, each of the positive/negative electrode pairs comprises a respective positive electrode 31, a respective separator 33 and a respective negative electrode 32 which are laminated together in the stated order. Each of the positive/negative electrode pairs are also laminated together to form a laminated body 70. The outer lateral edges of the separators 33 are then adhered together (and, in the preferred embodiment) bent upwardly as viewed in FIG. 3 to form the integrated electrode body 3. Specifically, a first insulation tape 51 is provided on a W1 side (the left side as viewed in FIG. 3) of the laminated body 70 and extends from the second main surface 70b of the laminated body 70, upwardly across the left lateral edge of the laminated body (so as to adhere the left lateral edges of the separators 33 to each other and to push them upwardly) and onto the first main surface 70a of the laminated body 70. As a result, at least a lateral leading end part of a first end part 33e1 of the separators 33 are held so that at least the leading end part of the first end part 33e1 is bent upwardly (more generally, toward one side (T1 side)) in the lamination direction T.

A second insulation tape 52 is provided on a W2 side (the right side as viewed in FIG. 3) of the laminated body 70 and extends from the second main surface 70b of the laminated body 70, upwardly across the right lateral edge of the laminated body (so as to adhere the right lateral edges of the separators 33 to each other and to push them upwardly) and onto the first main surface 70a of the laminated body 70. As a result, at least a lateral leading end part of a second end part 33e2 of the separators 33 are held so that at least the leading end part of the second end part 33e2 is bent upwardly (more generally, toward one side (T1 side)) in the lamination direction T.

The method of joining the insulation tapes 51 and 52 with the laminated body 70 is not particularly limited. For example, the insulation tapes 51 and 52 may be joined with the laminated body 70 directly or by adhesive bonding using an adhesive bonding agent. The insulation tapes 51 and 52 may be formed of adhesive bonding tapes and bonded to the laminated body 70. The insulation tapes 51 and 52 may be formed of double-sided adhesive bonding tapes and bonded to the laminated body 70, and the laminated body 70 may be bonded and fixed to the case 2 through the insulation tapes 51 and 52. This configuration effectively reduces displacement of the laminated body 70 in the case 2. Alternatively, the insulation tapes 51 and 52 and the laminated body 70 may be fixed together by using an adhesive bonding tape different from the insulation tapes 51 and 52.

As used herein, "adhesive bonding" includes "adhesion" and "bonding". Thus, an adhesive bonding agent includes both an adhesive agent and a bonding agent. An adhesive bonding tape includes an adhesive tape and a bonding tape.

The insulation tape 5 may be, for example, a tape made of resin such as polyimide, polypropylene, or acrylic, or metal foil such as aluminum foil, copper foil, stainless steel foil, or nickel foil, the surface of which is coated with an insulation layer.

In the electrode body 3, the positive electrode 31 and the separator 33 may be bonded to each other through a bonding agent, and the negative electrode 32 and the separator 33 may be bonded to each other through a bonding agent.

The electrode body 3 and the case 2 are joined together. Specifically, as illustrated in FIG. 3, the electrode body 3 is bonded and fixed to an inner surface of the case 2 through a bonding layer 6. In FIG. 3, the electrode body 3 is joined on the upper side (T1 side) relative to the case 2, but may also or alternatively be joined on the lower side. The electrode body 3 may also be joined to inner surfaces of the case 2 on both sides in the thickness direction T.

Figure 4:
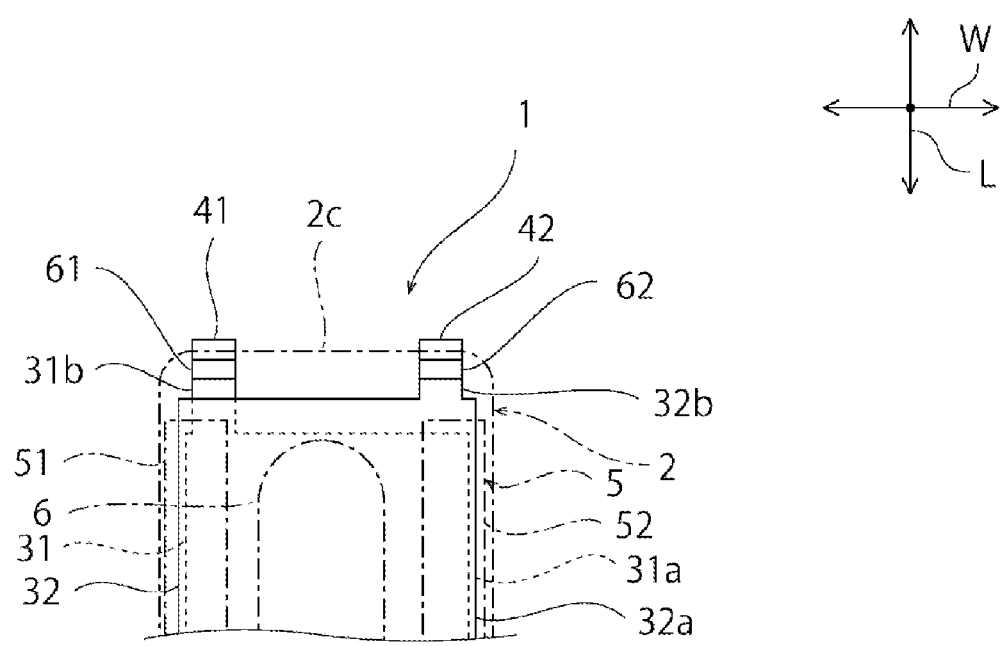
FIG. 4 is a schematic plan view of part of the electric storage device according to the first embodiment.

As illustrated in FIG. 4, each of the positive electrodes 31 includes a generally rectangular positive electrode body 31a and a first extended part 31b which extends from the positive electrode body 31a in a length direction L. Each of the negative electrodes 32 includes a generally rectangular negative electrode body 32a and a second extended part 32b which extends from the negative electrode body 32a in the length direction L. While this is preferred, the first and/or second extended parts may extended in directions other than the length direction L.

Figure 5:
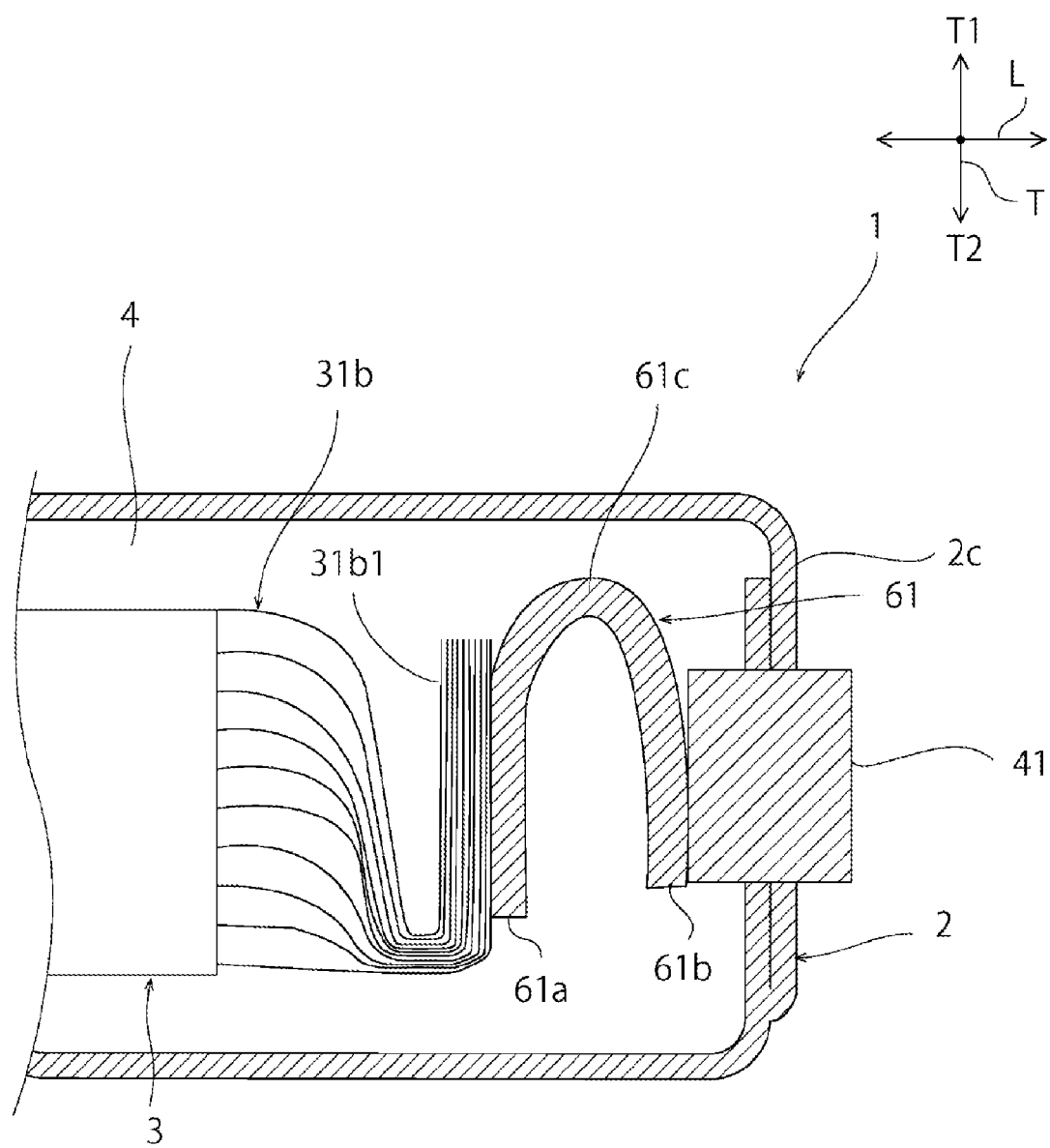
FIG. 5 is a schematic cross-sectional view taken along line V-V in FIG. 1.

As illustrated in FIGS. 1, 2, 4, and 5, a positive electrode terminal 41 is provided on a side surface 2c of one side of the case 2 in the length direction L. The positive electrode terminal 41 is electrically connected with each of the first extended parts 31b of the positive electrodes 31. Specifically, as illustrated in FIG. 5, each of the first extended parts 31b, which are physically and electrically connected to one another, are bent such that their leading end part 31b1 extends upwardly (as viewed in FIG. 3) toward the T1 side along the lamination direction T. The leading end parts 31b1 are connected to the positive electrode terminal 41 through a first connection member 61.

The first connection member 61 includes a first part 61a which is physically and electrically connected to the first extended parts 31b1, a second part 61b which is physically and electrically connected to the positive electrode terminal 41 and a first bent part 61c which physically and electrically connects the first and second parts 61a and 61b and which protrudes upwardly (as viewed in FIG. 3) toward the T1 side. The first connection member 61 is preferably an elastic member made of, for example, metal. Accordingly, the first connection member 61 is elastic in the length direction L.

Figure 6:
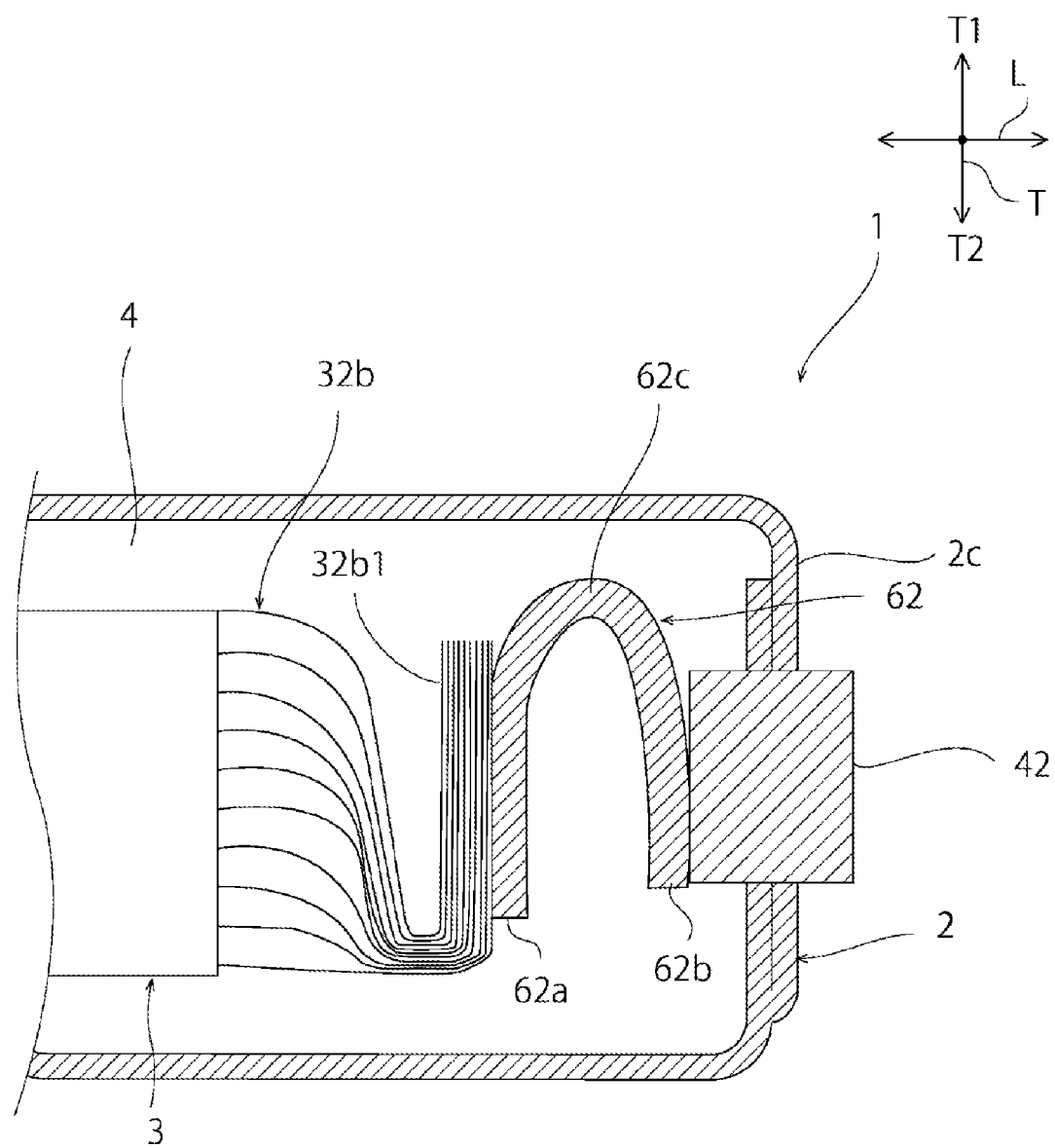
FIG. 6 is a schematic cross-sectional view taken along line VI-VI in FIG. 1.

As illustrated in FIGS. 1, 2, 4, and 6, a negative electrode terminal 42 is provided on the side surface 2c of the case 2. The negative electrode terminal 42 is electrically connected with the second extended parts 32b which are physically and electrically connected to one another. Specifically, as illustrated in FIG. 6, each of the first extended parts 32b are bent such that their leading end part 32b1 extends upwardly (as viewed in FIG. 3) toward the T1 side along the lamination direction T. The leading end parts 32b1 are connected to the negative electrode terminal 42 through a first connection member 62.

The second connection member 62 includes a third part 62a which is electrically and physically connected with the second extended parts 32b, a fourth part 62b which is physically and electrically connected with the negative electrode terminal 42, and a second bent part 62c which physically and electrically connects the third part 62a and to the fourth part 62b and which protrudes toward the T1 side. The second connection member 62 is an elastic member made of, for example, metal. Accordingly, the second connection member 62 is elastic in the length direction L.

The electric storage device 1 includes the first and second connection members 61 and 62 which are both elastic in the length direction L. With this configuration, when, for example, stress, impact, or vibration is applied to the electric storage device 1, transfer of the stress or the like to the electrode body 3 is buffered by the first and second connection members 61 and 62. Accordingly, the electric storage device 1 has excellent impact resistance.

The electrode body 3 and the case 2 are joined together which prevents the electrode body 3 from being displaced relative to the case 2 in the width or length directions W or L and colliding with the case 2. Thus, the electric storage device 1 has an excellent impact resistance. In particular, in the electric storage device 1, the electrode body 3 and the case 2 are bonded to each other through the bonding layer 6. With this configuration, transfer of impact applied to the case 2 to the electrode body 3 is buffered by the bonding layer 6. This further improves the impact resistance of the electric storage device 1.

In addition, the bonding layer 6 is preferably elastic, adhesive, or elastic and adhesive to achieve excellent impact resistance.

The first and second connection members may be provided with a plurality of bent parts. However, when a plurality of bend parts are provided, the sizes of the first and second connection members tends to increase. For this reason, it is preferred that the first and second connection members and 62 are each provided with a single bent part 61c and 62c. With this configuration, the first and second connection members 61 and 62 are small-sized. Thus, the size of the electric storage device 1 can be reduced.

The present embodiment describes the example in which the first and second electrode terminals are each separate components from the case itself. However, the present invention is not limited to this configuration. For example, one of the first and second electrode terminals may be formed as part of the case.

In the present invention, each separator is not particularly limited as long as the separator insulates a positive electrode and a negative electrode from each other. The separator may be provided, for example, in a folded or winding shape.

(Method of Manufacturing Electric Storage Device 1)

The following describes an exemplary method of manufacturing the electric storage device 1.

Figure 7:
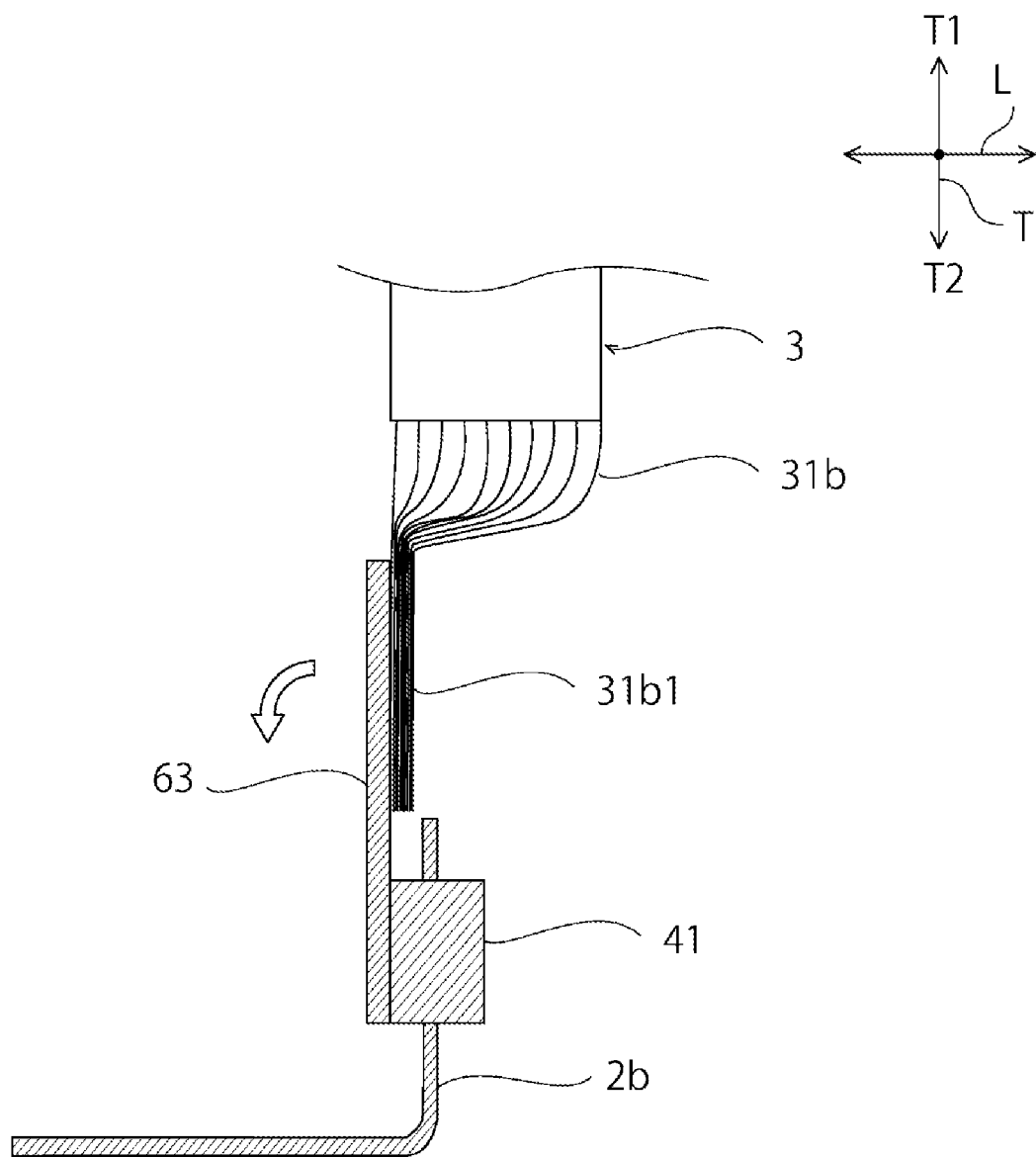
FIG. 7 is a schematic cross-sectional view for description of a method of manufacturing the electric storage device according to the first embodiment.

First, as illustrated in FIG. 7, a first case piece 2b (only a portion of which is shown in FIG. 7) that forms one half of the case 2, a first flat metal plate 63 for forming the first connection member 61 and the electrolyte 4 are prepared. While not shown in FIG. 7, a second case piece (forming the other half of the case) and a second flat metal plate 63' for forming the second connection member 62 are also prepared.

Subsequently, one side of one end of the flat metal plate 63 is joined with the positive electrode terminal 41 (which is attached to the first case piece 2a) and the other side of the other flat metal plate 63 is joined with the leading end parts 31b1 of the first extended parts 31b of the positive electrodes of the electrode body 3. The joining is preferably performed by a method such as laser welding, ultrasonic wave welding, resistance welding, or bonding through a conductive bonding agent.

Similarly, one side of one of the flat metal plate 63' (not shown) is joined with the negative electrode terminal 42 (which is preferably also attached to the first case piece 2a) and the other side of the other flat metal plate 63' is joined with the leading end parts 32b1 of the second extended parts 32b of the negative electrodes of the electode body 3. The joining is preferably performed by a method such as laser welding, ultrasonic wave welding, resistance welding, or bonding through a conductive bonding agent.

The positive and negative electrode terminals 41 and 42 are preferably provided on a side surface of the case 2 that does not form the cutout part 2a. The positive electrode terminal 41 and the negative electrode terminal 42 are preferably provided so that a virtual straight line connecting the center of the positive electrode terminal 41 and the center of the negative electrode terminal 42 does not overlap with the electrode body 3 in plan view (i.e., as viewed in FIG. 3). With this configuration, no positional interference occurs between the electrode body 3 and the case 2.

In contrast, when the positive and negative electrode terminals 41 and 42 are provided on a side surface of the case 2 forming the cutout part 2a, or when the positive and negative terminals 41 and 42 are provided so that the virtual straight line connecting the center of the positive electrode terminal 41 and the center of the negative electrode terminal 42 overlaps with the electrode body 3 in plan view, the joining of the flat metal plates 63 as described above is difficult due to the positional interference between the electrode body 3 and the case 2. Thus, the connection members need to be connected with the terminals and the extended parts in the case. This makes the manufacturing of the electric storage device difficult.

Subsequently, each of the flat metal plates 63 (one to form the first connection member 61, the other to form the second connection member 62, is curved to position the electrode body 3 in the second case piece 2b. Subsequently, the first and second case pieces are joined to each other to form the case 2.

Subsequently, the electrolyte 4 is injected into the case 2, and then the case 2 is sealed, which completes the electric storage device 1.

Other exemplary preferable embodiments of the present invention will be described below. In the following description, a component having a function effectively identical to that in the above-described first embodiment will be denoted by an identical reference sign, and description thereof will be omitted.

Second Embodiment

Figure 8:
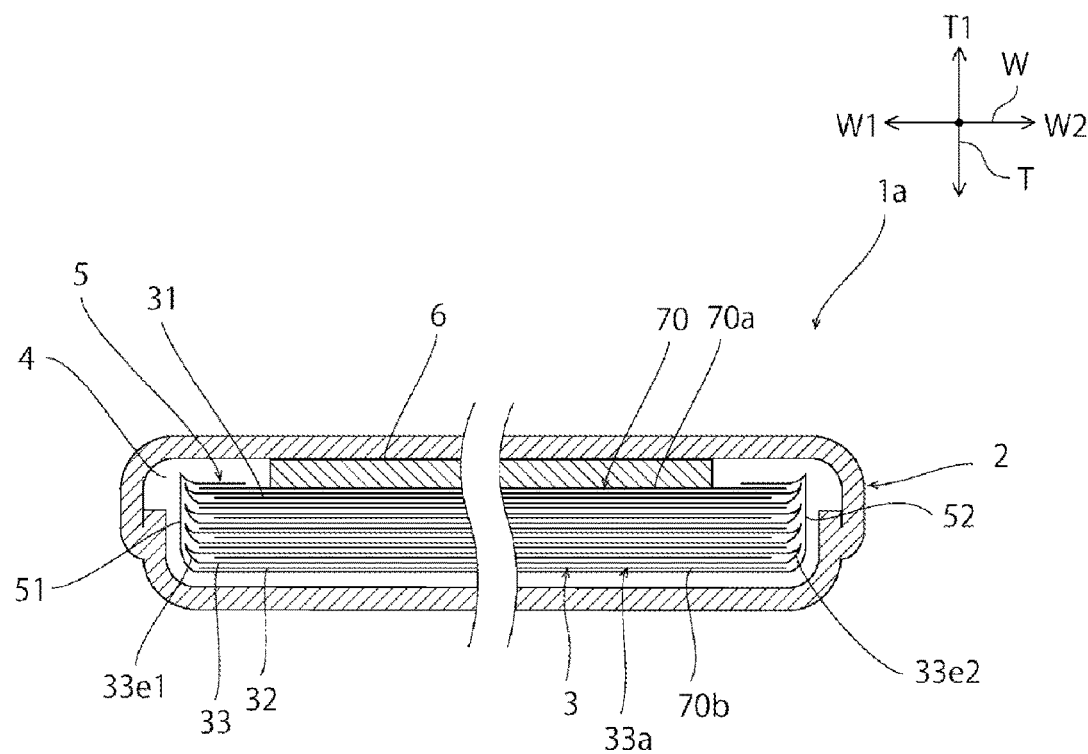
FIG. 8 is a schematic cross-sectional view of an electric storage device according to a second embodiment.

FIG. 8 is a schematic cross-sectional view of an electric storage device 1a according to a second embodiment.

The first embodiment describes the example in which a pair of insulation tapes 51 and 52 are used. However, the present invention is not limited to this configuration. For example, as illustrated in FIG. 8, the first and second insulating tapes 51, 52 may be connected with each other to form a single tape 5. In this case, the number of components included in the electric storage device 1a can be reduced.

Third Embodiment

Figure 9:
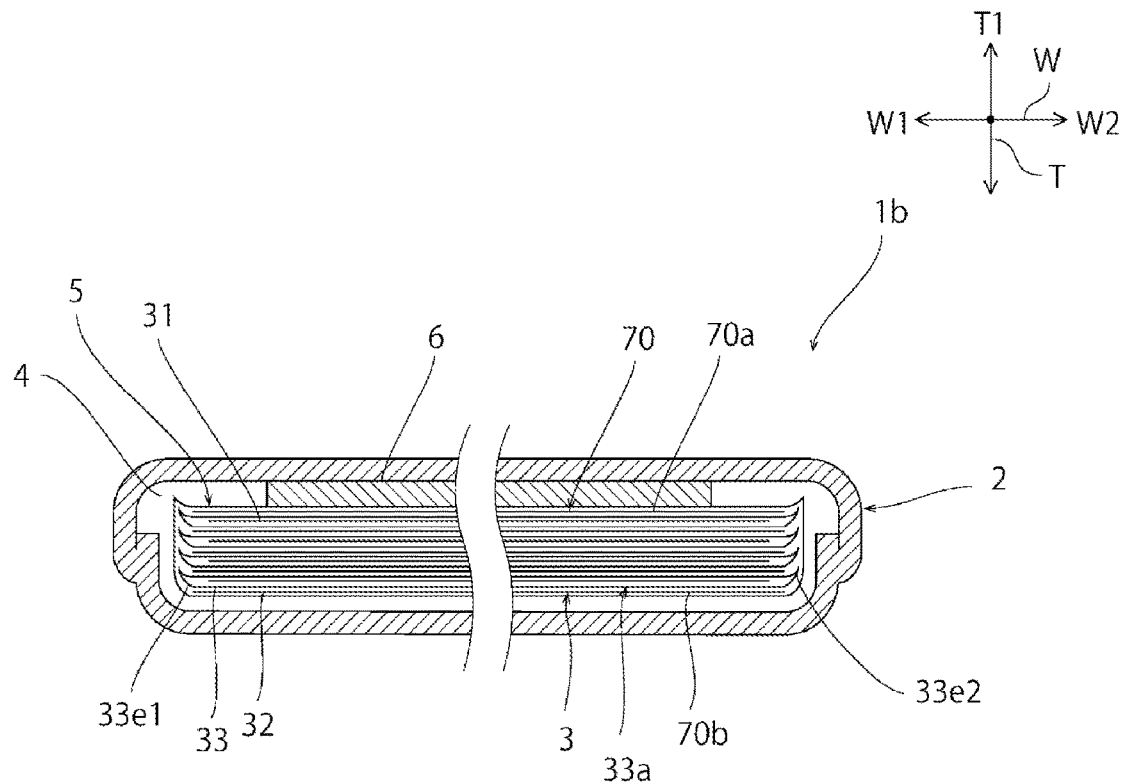
FIG. 9 is a schematic cross-sectional view of an electric storage device according to a third embodiment.

FIG. 9 is a schematic cross-sectional view of an electric storage device 1b according to a third embodiment.

As illustrated in FIG. 9, the insulating tape 5 may be wound around an entire periphery of the laminated body 70.

Fourth Embodiment

Figure 10:
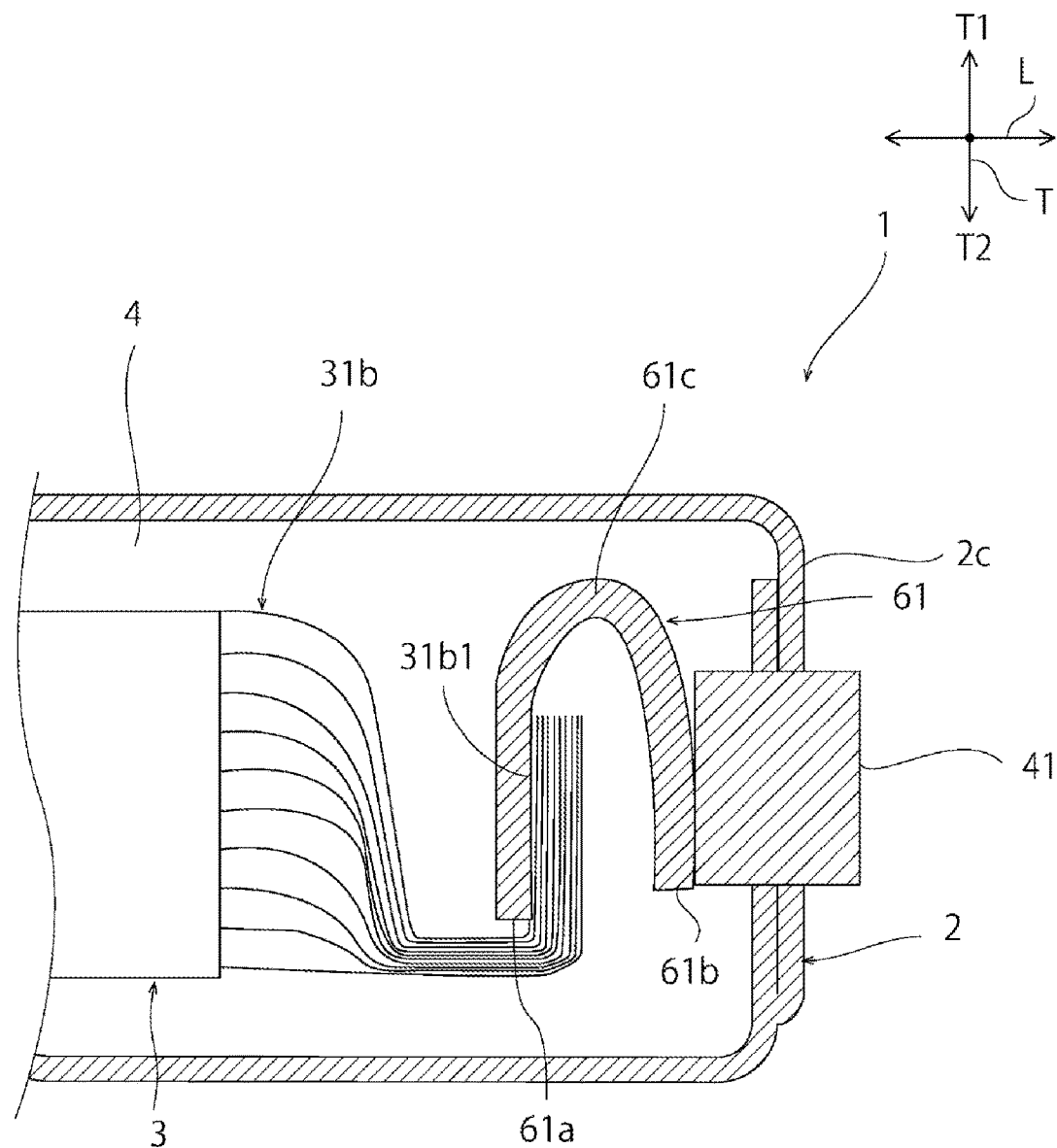
FIG. 10 is a schematic cross-sectional view of part of an electric storage device according to a fourth embodiment.
Figure 11:
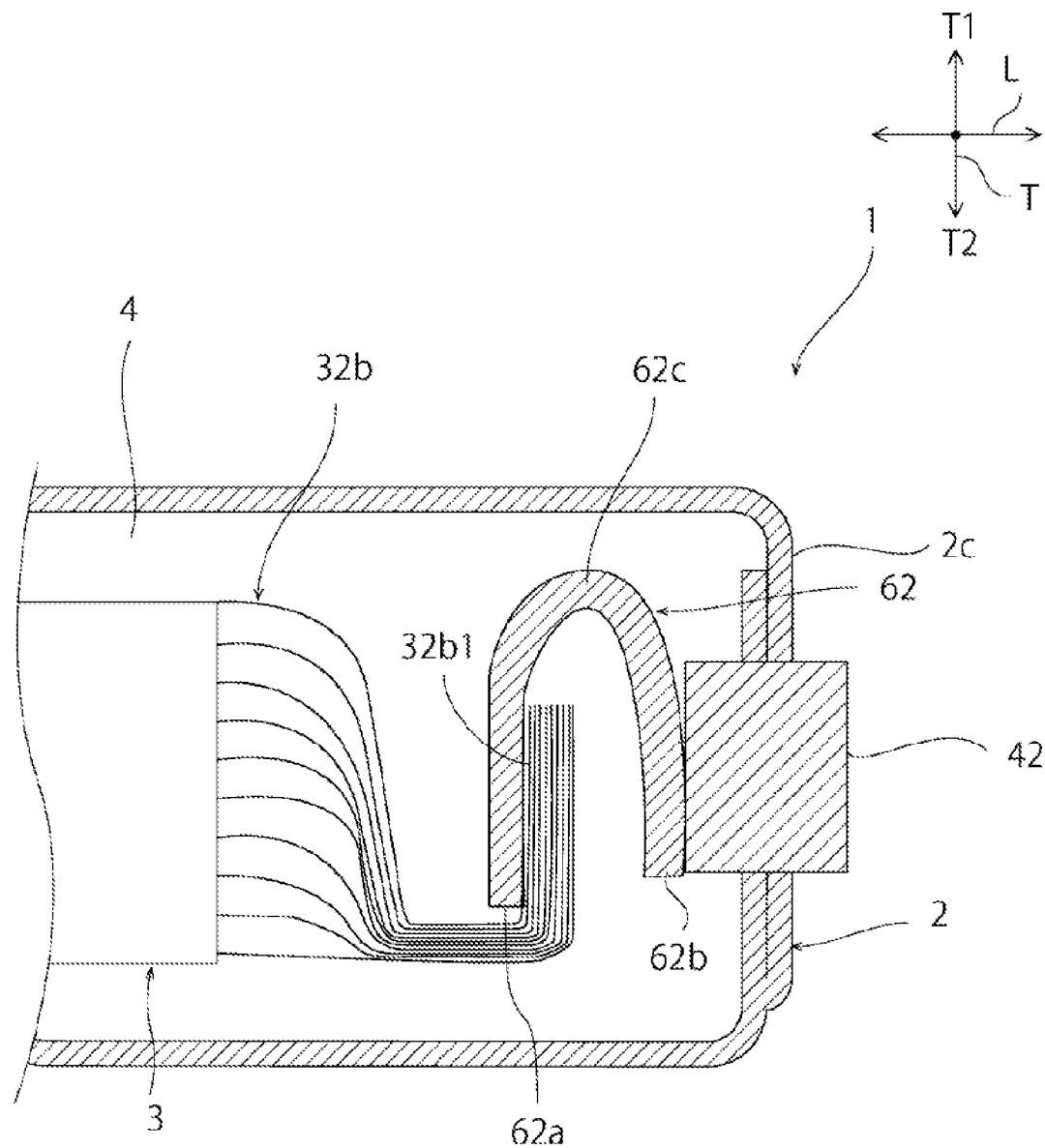
FIG. 11 is a schematic cross-sectional view of part of the electric storage device according to the fourth embodiment.

As illustrated in FIGS. 10 and 11, the first connection member 61 may be connected with a side of the leading end parts 31b1 of the first extended part 31b opposite to the positive electrode terminal 41 in the length direction L, and the second connection member 62 may be connected with a side of the leading end parts 32b1 of the second extended part 32b opposite to the negative electrode terminal 42 in the length direction L.

DESCRIPTION OF REFERENCE SYMBOLS 1, 1a, 1b: Electric storage device
2: Case
2a: Cutout part
2b: Second case piece
2c: Side surface
3: Electrode body
4: Electrolyte
5: Insulation tape
6: Bonding layer
31: Positive electrode
31a: Positive electrode body
31b: First extended part
31b1: Leading end part of first extended part
32: Negative electrode
32a: Negative electrode body
32b: Second extended part
32b1: Leading end part of second extended part
33: Separator
33a: Bag-shaped separator
33e1: First end part
33e2: Second end part
41: Positive electrode terminal
42: Negative electrode terminal
51: First insulation tape
52: Second insulation tape
61: First connection member
61a: First part
61b: Second part
61c: First bent part
62: Second connection member
62a: Third part
62b: Fourth part
62c: Second bent part
63: Flat metal plate
70: Laminated body 70a: First main surface
70b: Second main surface

The invention claimed is:
1. An electric storage device comprising:
a hollow case having an enclosed interior space and an exterior surface;
an electrode body disposed in the enclosed interior space of the case and including a plurality of electrode pairs which are the only electrode pairs in the interior space of the case, each electrode pair including a first electrode, a second electrode, and a separator disposed between the first and second electrodes, at least a plurality of the first electrodes having a respective first electrode extension part, the first electrode extension part of each of the first electrodes which have the first electrode extension part extending outside of the electrode body and abutting one another at a first leading end part located inside the interior space of the hollow case so as to be physically and electrically coupled to one another, at least a plurality of the second electrodes having a respective second electrode extension part extending outside of the electrode body and abutting one another at a second leading end part located inside the interior space of the hollow case so as to be physically and electrically coupled to one another;
an electrolyte located in the enclosed interior space of the case and at least partially impregnating the electrode body;
a first electrode terminal exposed at a first position at the exterior surface of the hollow case and being electrically connected to the first leading end part by a first elastic, conductive connection member which is located in the interior space of the hollow case and has elasticity in a direction extending from the first electrode terminal to the first leading end part, the first elastic, conductive connection member having a single bend and being in both physical and electrical contact with only one of the first electrode extension parts; and
a second electrode terminal exposed at a second position at the exterior surface of the hollow case and being electrically connected to the second leading end part by a second elastic, conductive connection member which is located in the interior space of the hollow case and has elasticity in a direction extending from the second electrode terminal to the second leading end part, the second elastic, conductive connection member having a single bend.

2. The electric storage device according to claim 1, wherein:
the hollow case comprises upper and lower main walls having one or more side walls extending there between, the hollow case lying in a plane extending between the upper and lower main walls; and
the first and second electrode terminals are each provided on respective parts of one or more of the side walls.

3. The electric storage device according to claim 2, wherein a virtual straight line connecting a center of the first electrode terminal and a center of the second electrode terminal does not overlap with the electrode body as viewed along the plane of the hollow case.

4. The electric storage device according to claim 2, wherein the electrode body is adhesively joined to one of the upper and lower main walls and is spaced from the other of the upper and lower main walls.

5. The electric storage device according to claim 2, wherein the hollow case has an outer shape as viewed along the plane that is rectangular in shape with a rectangular cut out extending along two sides of the rectangular shape.

6. The electric storage device according to claim 1, wherein a virtual straight line connecting a center of the first electrode terminal and a center of the second electrode terminal does not overlap with the electrode body as viewed along a plane in which the hollow case lies.

7. The electric storage device according to claim 1, wherein:
the first elastic, conductive connection member is constituted by a plate member including a first part connected to the first leading end part, a second part connected to the first electrode terminal, and a first bent part connecting the first and second parts; and
the second elastic, conductive connection member is constituted by a plate member including a third part connected to the second leading end part, a fourth part connected to the second electrode terminal, and a second bent part connecting the third and fourth parts.

8. The electric storage device according to claim 1, wherein the electrode body and the hollow case are physically joined together.

9. The electric storage device according to claim 1, wherein the electrode body and the case are physically joined together by an adhesive layer bonding the electrode body to the hollow case.

10. The electric storage device according to claim 1, wherein at least one of the first and second electrode terminals are formed by the hollow case.

11. The electric storage device according to claim 1, wherein the first and second elastic, conductive connection members are each U-shaped members.

12. The electric storage device according to claim 1, wherein each of the first and second elastic, conductive connection members bends back on itself.

13. The electronic storage device according to claim 1, wherein the first and second elastic, conductive connection members are both solid metallic plates.

14. The electronic storage device according to claim 1, wherein the only one of the first electrode extension parts is an outermost one of the first electrode extension parts.

15. The electronic storage device according to claim 1, wherein the second elastic, conductive connection member is in both physical and electrical contact with only one of the second electrode extension parts.

16. The electronic storage device according to claim 1, wherein all of the first electrodes have a respective first electrode extension part.

17. The electronic storage device according to claim 16, wherein all of the second electrodes have a respective second electrode extension part and wherein each of the second electrode extension parts are physically and electrically coupled to one another at the second leading end.

18. An electric storage device comprising:
a hollow case having an enclosed interior space and an exterior surface;
positive and negative spaced external electrode terminals which are exposed at respective positions at the exterior surface of the hollow case;
an electrode body disposed in the interior space of the hollow case, the electrode body including a plurality of electrode pairs which are the only electrode pairs in the interior space of the case, each electrode pair including a positive electrode and a negative electrode separated by a respective separator;
each of the positive electrodes having a respective positive electrode extension part extending outside of the electrode body and into the interior space of the hollow case, the positive electrode extension parts of each of the positive electrodes which have the positive electrode extension part abutting one another at a first leading end part located inside the hollow space of the hollow case so as to be physically and electrically coupled to one another;

each of the negative electrodes having a respective negative electrode extension part extending outside of the electrode body and into the interior space of the hollow case, the negative electrode extension parts abutting one another at a second leading end part located inside the hollow space of the case so as to be physically and electrically coupled to one another;

an electrolyte located in the case and at least partially impregnating the electrode body;

a first elastic connection member electrically connecting the first leading end part to the positive external electrode terminal, the first elastic connection member having a single bend and an elasticity in a direction extending from the positive external electrode terminal to the first leading end part, the first elastic connection member being in both physical and electrical contact with only one of the positive electrode extension parts; and a second elastic connection member electrically connecting the second leading end part to the negative external electrode terminal, the second elastic connection member having a single bend and having an elasticity in a direction extending from the negative external electrode terminal to the second leading end part.

19. The electric storage device according to claim 18, wherein the first and second elastic connection members are each U-shaped members.

20. The electric storage device according to claim 18, wherein each of the first and second elastic connection member bends back on itself.

21. The electric storage device according to claim 18, wherein:
the first elastic connection member is constituted by an elastic plate member including a first part connected to the first leading end part, a second part connected to the positive electrode terminal, and a first bent part connecting the first and second parts; and
the second connection member is constituted by an elastic plate member including a third part connected to the second leading end part, a fourth part connected to the negative electrode terminal, and a second bent part connecting the third and fourth parts.

22. The electric storage device according to claim 18, wherein:
the positive electrode extension parts are elastic in a direction extending from the first leading end part to the electrode body; and
the negative electrode extension parts are elastic in a direction extending from the second leading end part to the electrode body.

23. The electronic storage device according to claim 18, wherein the first and second elastic connection members are both solid metallic plates.

24. The electronic storage device according to claim 18, wherein the only one of the first electrode extension parts is an outermost one of the first electrode extension parts.

25. The electronic storage device according to claim 18, wherein the second elastic, conductive connection member is in both physical and electrical contact with only one of the negative electrode extension parts.

* * * * *